United States Patent [19]

Carroll et al.

[11] 4,382,108

[45] May 3, 1983

[54] NOVEL COMPOSITIONS AND PROCESS

[75] Inventors: Woodrow Carroll, Mont Belvieu; Thomas R. McClellan, Seabrook, both of Tex.

[73] Assignee: The Upjohn Company, Kalamazoo, Mich.

[21] Appl. No.: 332,764

[22] Filed: Dec. 21, 1981

[51] Int. Cl.³ .................. B32B 3/18; B32B 5/16; B32B 5/22

[52] U.S. Cl. .................. 428/326; 156/62.2; 156/331.7; 264/122; 428/327; 428/402; 428/407; 428/423.3; 428/425.1; 428/537; 428/2

[58] Field of Search .......... 428/326, 327, 2, 537, 428/425.1, 423.3, 407, 402; 264/122; 156/62.2, 330.9, 331.7

[56] References Cited

U.S. PATENT DOCUMENTS

| | | | |
|---|---|---|---|
| 2,879,005 | 3/1959 | Jarvis | 241/14 |
| 3,738,946 | 6/1973 | Frulla et al. | 260/2.3 |
| 3,836,486 | 9/1974 | Hafner | 260/2.3 |
| 3,959,195 | 5/1976 | Eriksson | 428/326 |
| 4,045,603 | 8/1977 | Smith | 428/326 |
| 4,097,648 | 6/1978 | Pringle | 428/2 |
| 4,145,389 | 3/1979 | Smith | 264/122 |
| 4,246,310 | 1/1981 | Hunt | 428/326 |
| 4,257,995 | 3/1981 | McLaughlin | 528/51 |
| 4,257,996 | 3/1981 | Farrissey | 528/51 |

FOREIGN PATENT DOCUMENTS

| | | | |
|---|---|---|---|
| 659664 | 3/1963 | Canada | 428/326 |
| 940686 | 1/1974 | Canada | 428/326 |
| 2447174 | 11/1976 | Fed. Rep. of Germany | |
| 51-34972 | 3/1976 | Japan | |
| 55-1183 | 6/1980 | Japan | |

Primary Examiner—Ellis P. Robinson
Attorney, Agent, or Firm—Denis A. Firth; John Kekich

[57] ABSTRACT

Composite panels are disclosed which comprise outer layers derived from cellulosic and like material conventionally employed in particle boards and an inner layer which is comminuted scrap plastic material, the various layers and the particles in them being bonded together using an organic polyisocyanate binder. Optionally the binder contains an internal release agent. The composites, in addition to representing a valuable way in which to utilize scrap plastic, also possess improved properties compared with the corresponding panels which lack the inner core. In a particular embodiment the scrap plastic used is derived from junked automobiles.

18 Claims, No Drawings

NOVEL COMPOSITIONS AND PROCESS

BACKGROUND OF THE INVENTION

1. Field of the Invention

This invention relates to composite panels and methods for their preparation and is more particularly concerned with panels having an inner core utilizing comminuted scrap plastic material and with methods for their preparation.

2. Description of the Prior Art

One of the side effects of the startling growth of the plastics industry, particularly in recent years, has been the creation of a problem of considerable magnitude, namely, that of disposing of the vast quantities of scrap plastic material which are being generated. For example, the present trend in the automotive industry is to replace as much of the metal structural parts as possible with synthetic plastics and this is exacerbating the waste disposal problem. Disposal of plastic scrap in landfill operations is becoming less and less possible or desirable and attention is being turned to economically feasible ways in which to utilize or recycle the scrap material.

Illustratively, a number of ways of recovering useful polyols from scrap polyurethane have been described; see, for example, U.S. Pat. No. 3,738,946 and the prior art which is discussed therein. Recovery and recycling of polyvinylchloride and like plastics is also receiving considerable attention; see, for example, U.S. Pat. No. 3,836,486.

Numerous references are made in the literature to the recovery and incorporation of scrap plastic material as an inert filler in a variety of products. One of the fields in which such types of recycling has been explored is that of formation of particle board. Illustratively, Japanese Kokoku No. 1183/80 describes the incorporation of ground glass fiber waste into particle board. German OLS No. 2447174 describes the continuous poduction of insulating panels and the like using granulated scrap rubber and like waste. Japanese Kokoku No. 34972/51 describes the preparation of fiberboard from material which has been obtained by crushing urban waste with water, separating the metal, glass, stone and large particles therefrom, and recovering fibrous waste which contains plastic film waste and wood waste. The fibrous material so obtained is used as the core of a laminate which is compressed using heat and pressure to form a fibrous board.

To the best of the present Applicant's knowledge it has not previously been recognized that the physical properties of particle boards can be significantly improved by incorporating therein, as an inner core, scrap plastic which has been comminuted to particle size which will be described below. It is believed that the present invention represents not only a highly useful manner in which to employ waste scrap plastic, but provides a method of upgrading the properties of particle boards.

SUMMARY OF THE INVENTION

This invention comprises composite panels which panels comprise:

an inner core layer of scrap plastic in particulate form;

said inner core layer being sandwiched between outer layers of particles of organic material capable of being compacted under pressure;

said inner and outer layers and the particles in said layers being bonded together using a binder which comprises an organic polyisocyanate.

The invention also comprises processes for the manufacture of the above types of composite panel.

DETAILED DESCRIPTIION OF THE INVENTION

The composite panels of the invention can be prepared by any of the methods previously described in the art for the preparation of particle boards using polyisocyanate as the binder resin, the novel feature of the invention being the incorporation of comminuted scrap plastic material as an inner layer. Methods for the preparation of particle boards using organic polyisocyanate binders are well-known in the art; see, for example, U.S. Pat. No. 4,257,995 and the various references cited therein. As set forth therein particle boards can be prepared using polyisocyanate as the binder and employing particles of cellulosic and other materials which are capable of being compacted and bonded into the form of boards. Typical such materials are wood particles derived from lumber manufacturing waste such as planar shavings, veneer chips, wafers and the like. Particles of other cellulosic materials such as shredded paper, pulp or vegetable fibers such as corn stalks, straw, bagasse, and the like, and of non-cellulosic materials such as scrap polyurethane, polyisocyanurate and the like polymer foams can also be used. Inorganic materials such as hydrated alumina, gypsum, chopped mineral fibers and the like can also be employed either alone or in combination with any of the above cellulosic or non-cellulosic materials.

In the conventional methods of preparing particle board using organic polyisocyanates as binders, the binder resin is generally applied, either neat or in the form of an aqueous emulsion, to the particles employed to form the particle board prior to forming the board from the treated particles using heat and pressure. An internal release agent can be incorporated into the organic polyisocyanate binder if desired. Such release agents include hydrocarbyl mono- and di-acid phosphates, hydrocarbyl sulfonic acids and the like. Examples of such internal release agents are shown in U.S. Pat. Nos. 4,257,995, 4,257,996, and 4,258,169 and in German OLS Nos. 2921689 and 2921726.

The necessary heat and pressure required to form the board from the coated particles is generally applied utilizing a heavy-duty press with heated metal platens. However, other forms of heat such as radio frequency radiation can be used. In many instances caul plates are employed and these are interposed between the platens of the press and the boards being formed. In continuous forming operations, continuous belts may be used in place of individual caul plates. The caul plates or continuous belts are generally fabricated from aluminum, cold rolled steel, hot rolled steel, or stainless steel.

It has now been found that the physical properties, and more particularly the flexural modulus properties, of particle boards can be improved by incorporating into the boards a layer of scrap plastic material which has been previously comminuted to a relatively small particle size. For this purpose any of the more commonly available plastic scrap materials can be employed including scrap derived from ABS resins, acrylic resins, nylon type materials, phenolic resins, polyethylene and polypropylene, polyvinyl chloride, and the like. These materials can be employed individually or in combination.

A type of plastic scrap material which is becoming increasingly available, due to the trends in the automobile industry to replace metal by plastic in fittings as well as in body components, is the total scrap recovered by stripping the plastic from the interior and or exterior of junked automobiles. At the present time there is an average of from 50 to 80 kilograms of plastic used per automobile. It is conservatively estimated that approximately 10 million automobiles are scrapped per year on a worldwide basis. It will, therefore, be seen that vast amounts of scrap plastic are available from this source alone. The scrap so recovered includes cellular as well as non-cellular material. The cellular material is derived from sources such as upholstery, padding, etc. on the interior of the automobile. The non-cellular material is recovered from trim and from fenders, bumpers and the like on the exterior of the vehicle. A variety of different plastics are involved and most of them will fall in one or other of the classes set forth above.

In utilizing plastic scrap from this source, or from any other source, as material to be integrated into the composite panels of the invention, it is necessary to reduce the scrap to a finely divided particulate form. Advantageously, the material is reduced to particles of a size such that the major part of it will pass through a 10 U.S. mesh sieve and preferably 95 percent will pass through a 20 U.S. mesh sieve. To achieve these particle sizes the comminution of the scrap plastic can be carried out using any methods conventional in the art. A particularly advantageous method is that which is known as cryogenic grinding. This is a well-recognized technique in the art and is particularly useful in the treatment of plastics which tend to melt as a result of heat generated in the grinding process and which, therefore, tend to clog the grinding apparatus. Typically, the procedure involves immersing the material to be ground in a cryogenic fluid to render the material brittle and then feeding the so treated material to a cryogenic impact mill to achieve the necessary degree of comminution. Illustrative of the equipment and procedures are those described and discussed in International Publication No. WO 80/02672. Other methods of grinding at lower temperatures such as that described in U.S. Pat. No. 2,879,005 can also be used to achieve the desired degree of comminution.

The comminuted plastic scrap so obtained is coated with binder composition in the same manner as the particles which are to be employed in the outer layers of the composite of the invention. Thus, the coating is generally accomplished by spraying the particles with the binder composition while the particles are being tumbled or agitated in a blender or like mixing apparatus. As previously stated, the binder can be used either as the neat organic polyisocyanate or as an aqueous emulsion of the isocyanate. Generally, a total of about 2 to about 8 percent by weight of the binder, calculated on a dry basis, i.e. excluding the water present if the binder is employed as an emulsion, is added based on the "bone dry" weight of the particles. However, higher or lower amounts of binder resin may be used in any given application. The amounts of binder in the lower range are generally employed when the particles are of a relatively large size, whereas amounts of binder in the upper range are employed when the particles are very small, that is, have a high surface area to volume ratio as is the case in the comminuted scrap plastic.

After the various particles have been coated in the above manner, they are generally formed into a loose mat or felt on a rigid plate. The latter can be the lower platen of the press or a caul plate if one is to be employed in the preparation of the particle board. In preparing the composites of the invention the mat is formed in layers. Firstly, a layer of the coated particles of the material which is to form the exterior of the board are placed on the rigid plate in an amount and a depth which is appropriate to the desired thickness of the particle board and of the layers therein. A second layer composed of the coated comminuted scrap plastic material is then placed on top of the first layer in an amount and in the appropriate depth to give the desired thickness of the inner core layer after pressing. Finally a second layer of coated particles which are to form the exterior of the board is applied. A second caul plate, if one is to be used, is placed on the mat and is spaced from the lower plate by spacer bars representing the desired thickness of the particle board to be produced. If a second caul plate is not used, the upper platen of the press serves to form the upper rigid surface employed in preparing the particle board.

The mat is then subjected to heat and compression in order to consolidate the coated particles into a unitary board. The pressing times, temperatures and pressures which are employed to achieve this result can vary widely depending on the thickness of the board produced, the desired density of the board, the size of the particles used and other factors well-known in the art. Illustratively, in order to prepare a half-inch thick particle board of medium density, pressures of about 300 to 1200 psi and temperatures of about 130° C. to 175° C. are typical. Pressing times can be of the order of about 2 to about 5 minutes, but higher or lower times can be employed in certain cases. The level of moisture present in the mat, particularly when wood particles are employed as the outer layer, is not critical since the polyisocyanate will react with a portion of the moisture present to form polyurea. However, it is generally desirable that the moisture content not exceed about 24 percent by weight in the particles which are used to form the board.

The above described process for the preparation of the composites of the invention can be carried out on a batch basis, that is, individual sheets of particle board can be molded by treating the appropriate amount of particles, arranged in layers as described above, and heating and pressing the treated material. Alternatively, the process can be carried out in a continuous manner by feeding treated particles in the form of a continuous web or mat through a heating and pressing zone defined by upper and lower continuous steel belts to which and through which the necessary heat and pressure are applied. In this continuous process the particles would be fed and formed into a continuous web by using three separate streams of coated particles. A first stream would deposit the first layer of the coated particles on to the continuous web and the second and third layers would then be deposited sequentially from appropriate feeding means at a later stage in the passage of the web prior to reaching the heating and pressing zone.

In a particular embodiment of the process of the invention it is found advantageous to include in the polyisocyanate binder an internal release agent in order to ensure good release of the finished particle board from the metal surfaces which form the mold used in its formation. Any of the release agents previously described in the art can be used. Such release agents are described in the aforesaid U.S. Pat. Nos. 4,257,995/6 and 4,258,169 as well as in German Offenlegungsschrift Nos. 2921689 and 2921726. A particularly preferred group of release agents are the alkyl mono- and diacid phosphates and the pyrophosphates derived therefrom. These are described and exemplified in the aforesaid U.S. Pat. No. 4,257,995.

In carrying out the process of the invention the metallic surfaces which come into contact with the boards during the pressing operation, whether these surfaces be those of caul plates or the platens, can, if desired, be pretreated by application of a layer of polytetrafluoroethylene to facilitate release of the finished board from said surfaces. Techniques for effecting such treatments are set forth in copending application Ser. No. 306,199, filed Sept. 28, 1981 by W. J. Farrissey et al.

The composite panels of the invention can be prepared in a range of densities and hardness. Advantageously, the density of the composite lies within the range of about 30 to about 70 pcf and preferably in the range of about 40 to about 60 pcf.

The polyisocyanates which are used as the binders in preparing the composites of the invention can be any organic polyisocyanate which contains at least two isocyanate groups per molecule. Illustrative of organic polyisocyanates are diphenylmethane diisocyanate, m- and p-phenylene diisocyanates, chlorophenylene diisocyanate, α,α-xylylene diisocyanate, 2,4- and 2,6-toluene diisocyanate and the mixtures of these two isomers which are available commercially, triphenylmethane triisocyanates, 4,4'-disocyanatodiphenylether, and polymethylene polyphenyl polyisocyanates. The latter polyisocyanates are mixtures containing from about 25 to about 90 percent by weight of methylenebis(phenyl isocyanate) the remainder of the mixture being polymerthylene polyphenyl polyisocyanates of functionality higher than 2.0. Such polyisocyanates and methods for their preparation are well-known in the art; see, for example, U.S. Pat. Nos. 2,683,730; 2,950,263; 3,012,008 and 3,097,191. These polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

The polymethylene polyphenyl polyisocyanates are the preferred polyisocyanates for use in the binder systems of the invention. Particularly preferred polymethylene polyphenyl polyisocyanates are those which contain from about 35 to about 65 percent by weight of methylenebis(phenyl isocyanate).

When the organic polyisocyanate is to be employed as binder system in the form of an aqueous emulsion or dispersion in accordance with the invention, the aqueous emulsion or dispersion can be prepared using any of the techniques known in the art for the preparation of aqueous emulsions or dispersions, prior to use of the composition as the binder. Illustratively, the polyisocyanate is dispersed in water in the presence of an emulsifying agent. The latter can be any of the emulsifying agents known in the art including anionic and nonionic agents. Illustrative of nonionic emulsifying agents are polyoxyethylene and polyoxypropylene alcohols and block copolymers of two or more of ethylene oxide, propylene oxide, butylene oxide, and styrene; alkoxylated alkylphenols such as nonylphenoxy poly(ethyleneoxy)ethanols; alkoxylated aliphatic alcohols such as ethoxylated and propoxylated aliphatic alcohols containing from about 4 to 18 carbon atoms; glycerides of saturated and unsaturated fatty acids such as stearic, oleic, and ricinoleic acids and the like; polyoxyalkylene esters of fatty acids such as stearic, lauric, oleic and like acids; fatty acid amides such as the dialkanolamides of fatty acids such as stearic, lauric, oleic and like acids. A detailed account of such materials is found in Encyclopedia of Chemical Technology, Second Edition, Vol. 19, pp. 531-544, 1969, Interscience Publishers, New York.

The formation of the emulsion or dispersion can be carried out at any time prior to its use as the binder composition, but, preferably, it is carried out within about 3 hours prior to use. Any of the methods conventional in the art for the preparation of aqueous emulsions can be employed in preparing the aqueous polyisocyanate emulsions employed in the process of the invention. Illustratively, the emulsion is formed by bringing the polyisocyanate, emulsifying agent and water together under pressure using a conventional spray gun in which the streams of water and polyisocyanate impinge and are mixed under turbulent conditions in the mixing chamber of the spray gun. The emulsion so formed is discharged in the form of a spray which is applied to the cellulosic particles to be formed into boardstock in the manner discussed below.

If an internal release agent is employed in combination with the polyisocyanate binder, the release agent can be brought into contact with the particles as a separate component during the coating process. It can be employed in neat form, that is without diluents, or as an aqueous solution or dispersion. Preferably, the internal release agent is incorporated into the polyisocyanate binder before application of the latter to the particles which are to be coated. The release agent is generally employed in a proportion within the range of about 0.1 to about 20 parts by weight per 100 parts by weight of polyisocyanate. Preferably, the release agent is employed in a proportion in the range of about 2 to about 10 parts by weight per 100 parts of polyisocyanate.

As previously set forth, the composite panels of the invention are found to possess improved physical properties as compared with panels which are prepared in the same density and hardness and otherwise by an identical process except that the inner core of scrap plastic is not employed. Thus, the composite panels of the invention are found to possess markedly increased flexural modulus as compared with exactly comparable panels which do not contain the inner core. All other properties of the panel are comparable to the properties of the conventional panel without the inner core. The composite panels of the invention can be employed for all purposes for which particle boards are conventionally employed in the construction, furniture and like industries.

The following example describes the manner and process of making and using the invention and sets forth the best mode contemplated by the inventors of carrying out the invention, but is not to be construed as limiting.

EXAMPLE

Preparation of Scrap

A wrecked 1977 Pontiac Trans Am was stripped of all exterior and interior plastic components. These included: interior seating and covers, headliner, trim and padding components, floor mats, seat divider console, exterior front and rear fascia grill and plastic lighting assemblies and trunk and floor padding components. The total weight of all the scrap plastic was approximately 140 lbs.

The metal fasteners and inserts employed in the original mounting of these components were removed and, for the purposes of evaluations, the scrap obtained from the interior of the vehicle was segregated from that removed from the exterior.

The segregated materials were then passed through a conventional granulator equipped with a suction device to facilitate passage of the lighter weight flexible, cellular scrap through the screen without plugging. This first granulation reduced the interior material to an average size of approximately $\frac{1}{4}''$ to $\frac{1}{2}''$ chunks and the exterior scrap to approximately $1/16''$ to $\frac{1}{8}''$ particles.

The segregated materials were introduced to a liquid nitrogen cryogenic grinding unit (Lin-Tech Inc.) operated at approximately $-200°$ F. and further reduced in size to the point that more than 95% would pass through a U.S. 20 mesh screen.

Aliquots of the comminuted exterior and interior scrap so obtained were intimately mixed in a proportion of 40 parts of exterior to 60 parts of interior, representing the approximate proportions by weight of the exterior and interior plastics removed from the car, and utilized to prepare a composite particle board in the following manner. A 2000 g. portion of the mixed comminuted scrap was charged to a tumbler/blender approximately 48'' in diameter and 24'' in depth equipped with 20 baffles ($24'' \times 2''$) to ensure thorough mixing and exposure of the particles. The blender was rotated at approximately 10 rpm while a total of 105 g. of an isocyanate binder resin containing internal release agent was sprayed on to the particles over a period of 15 minutes. Dispersion of the binder was accomplished using 30 psi air atomization. The binder comprised a mixture of polymethylene polyphenyl polyisocyanate (eq. wt.=133: functionality 2.8) and 7 percent by weight, based on total binder, of a mixture of mono- and dilauryl acid phosphate.

In the same manner, and using the same apparatus, a batch of 2000 g. of aspen wafers (measuring an average about $1.5'' \times 1.5'' \times 1/32''$) was spray coated with a total of 105 g. of the same isocyanate binder resin containing internal release agent.

A composite panel was then prepared in the following manner. Half of the batch of coated aspen wafers was formed into a mat on $36'' \times 30'' \times 1/16''$ cold rolled steel plate using a $20'' \times 20''$ wooden frame. The coated auto scrap was formed into a second layer on top of the first layer of aspen wafers. Finally, the remaining half of the coated aspen wafers was formed into a third layer on top of the layer of coated auto scrap. The wooden frame was removed and a second cold rolled steel plate, of the same dimensions as the first, was placed on top of the assembled mat. Two pieces ($36'' \times \frac{7}{8}'' \times \frac{7}{8}''$) of steel bar stock were interposed between the edges of the two plates to act as stops. The whole assembly was placed between the platens (preheated to 175° C.) of an electrically heated press. The press was closed over a period of 30–45 seconds until the upper platen encountered the stops. The pressure reached 1100 psi and was maintained thereat for 3 minutes with platen temperature at 175° C. Thereafter the composite panel so formed was removed from the assembly (no sticking of caul plates to the panel was observed) and was allowed to age for 1 week at 25° C. before being subjected to physical testing. The physical properties determined on samples of the board are set forth in the following Table together with the properties determined for a panel made exactly as described above but omitting the intermediate layer of scrap and using a total charge of 4000 g. of aspen wafers coated with 210 g. of isocyanate resin binder.

TABLE

| Property | Composite laminate | Aspen wafers alone |
|---|---|---|
| Hardness: Shore D | 60 | 60 |
| Density g/cc | 0.70 | 0.69 |
| Flexural modulus, psi | 384,000 | 130,000 |
| Modulus of Rupture, psi | 3360 | 6021 |
| Water Immersion 24 hr. at 25° C. | | |
| % change by volume | +21 | +20 |
| % change by weight | +50 | +92 |
| Taber Abrasion | | |
| 1000 cycles/1000 g. H22: loss (mg.) | 250 | 280 |

The above results showed that the introduction of the layer of scrap had dramatically increased the flexural modulus while causing a significant but not unsatisfactory drop in modulus of rupture.

What is claimed is:

1. A composite panel comprising:
   an inner core layer of scrap plastic in particulate form of a size such that the majority of the particles pass through a 10 U.S. mesh sieve;
   said inner core layer being sandwiched between outer layers of particles of cellulosic material capable of being compacted under pressure;
   said inner and outer layers and the particles in said layers being bonded together using a binder which comprises an organic polyisocyanate.

2. A composite panel according to claim 1 wherein said cellulosic particles are selected from the class consisting of wood wafers, wood flakes, wood chips, sawdust and mixtures thereof.

3. A composite panel according to claim 1 or 2 wherein the scrap plastic particles have been produced by comminuting assorted scrap plastic utilizing a cryogenic grinding operation.

4. A composite panel according to claim 3 wherein the scrap plastic particles are of a size such that 95 percent of said particles will pass through a 20 U.S. mesh sieve.

5. A composite panel according to claim 1 wherein the organic polyisocyanate is a polymethylene polyphenyl polyisocyanate containing from about 25 to about 90 percent by weight of methylenebis(phenyl isocyanate) the remainder of said mixture being oligomeric polymethylene polyphenyl polyisocyanates having a functionality of greater than 2.

6. A composite panel according to claim 5 wherein said polyisocyanate also comprises an internal release agent.

7. A composite panel according to claim 6 wherein said internal release agent is selected from the group consisting of monoalkyl acid phosphates, dialkyl acid phosphates, pyrophosphates derived from said phosphates, alylsulfonic acids, and mixtures thereof.

8. A composite panel comprising:
an inner core layer of scrap plastic in particulate form of a size such that the majority of the particles pass through a 10 U.S. mesh sieve;
said inner core layer being sandwiched between outer layers of wood particles;
said inner and outer layers and the particles in said layers being bonded together using an organic polyisocyanate binder.

9. A composite panel according to claim 8 wherein said polyisocyanate binder is a polymethylene polyphenyl polyisocyanate containing from about 25 to about 90 percent by weight of methylenebis(phenyl isocyanate) the remainder of said mixture being oligomeric polymethylene polyphenyl polyisocyanates having a functionality greater than 2.0.

10. A composite panel according to claim 8 or 9 wherein said outer layers comprise aspen wafers.

11. A composite panel according to claim 8 wherein said inner layer comprises scrap plastic particles produced by comminuting assorted scrap plastic utilizing a cryogenic grinding operation.

12. A composite panel according to claim 11 wherein said scrap plastic articles are of a size such that 95 percent of said particles will pass through a 20 U.S. mesh sieve.

13. A process for the preparation of a composite panel according to claim 1 which process comprises the steps of:

coating said particles of cellulosic material and said particles of scrap plastic with said organic polyisocyanate binder;
disposing a first layer of said coated particles of cellulosic material on a rigid mold plate;
disposing a layer of said coated particles of scrap plastic on the upper surface of said first layer;
disposing a second layer of said coated particles of cellulosic material on the upper surface of said layer of coated particles of scrap plastic; and
applying heat and pressure to said assemblage of layers.

14. A process according to claim 13 wherein said particles of scrap plastic prior to coating have been produced by comminution using a cryogenic grinding operation to a size such that 95 percent of said particles will pass through a 20 U.S. mesh sieve.

15. A process according to claim 13 wherein said cellulosic particles are selected from the class consisting of wood wafers, wood flakes, wood chips, sawdust and mixtures thereof.

16. A process according to claim 13 wherein said organic polyisocyanate employed as binder is a polymethylene polyphenyl polyisocyanate containing from about 25 to about 90 percent by weight of methylenebis(phenyl isocyanate) the remainder of said mixture being oligomeric polymethylene polyphenyl polyisocyanates having a functionality greater than 2.0.

17. A process according to claim 13 wherein said particles of cellulosic material and said particles of scrap plastic are also coated with an internal release agent.

18. A process according to claim 17 wherein said internal release agent is selected from the group consisting of monoalkyl acid phosphates, dialkyl acid phosphates, pyrophosphates derived from said phosphates, alkyl sulfonic acids and mixtures thereof.

* * * * *